(12) United States Patent
Iyer et al.

(10) Patent No.: US 9,251,228 B1
(45) Date of Patent: Feb. 2, 2016

(54) ELIMINATING NOISE IN PERIODICALS

(75) Inventors: Deepa Subramanian Iyer, Tamil Nadu (IN); Ramya Dass, Tamil Nadu (IN)

(73) Assignee: Amazon Technologies, Inc., Reno, NV (US)

(*) Notice: Subject to any disclaimer, the term of this patent is extended or adjusted under 35 U.S.C. 154(b) by 678 days.

(21) Appl. No.: 13/092,098

(22) Filed: Apr. 21, 2011

(51) Int. Cl.
*G06F 17/00* (2006.01)
*G06F 17/30* (2006.01)

(52) U.S. Cl.
CPC .............................. *G06F 17/30572* (2013.01)

(58) Field of Classification Search
CPC ................. G06F 17/30572; G06F 17/30011
USPC .......................................... 715/205, 734, 255
See application file for complete search history.

(56) References Cited

U.S. PATENT DOCUMENTS

| | | | |
|---|---|---|---|
| 6,535,617 B1* | 3/2003 | Hannigan et al. | 382/100 |
| 6,886,130 B1* | 4/2005 | Unger et al. | 715/207 |
| 2002/0040374 A1* | 4/2002 | Kent | 707/516 |
| 2003/0161007 A1* | 8/2003 | Maurer et al. | 358/3.26 |
| 2004/0010756 A1* | 1/2004 | Hobbs | 715/526 |
| 2004/0085345 A1* | 5/2004 | Galou et al. | 345/734 |
| 2004/0205614 A1* | 10/2004 | Keswa | 715/523 |
| 2004/0205641 A1* | 10/2004 | Shimizu | 715/527 |
| 2004/0207859 A1* | 10/2004 | Kadoi et al. | 358/1.1 |
| 2005/0060643 A1* | 3/2005 | Glass et al. | 715/501.1 |
| 2005/0131924 A1* | 6/2005 | Jones | 707/100 |
| 2006/0050332 A1* | 3/2006 | Nishikawa | 358/498 |
| 2007/0097443 A1* | 5/2007 | Ishiguro et al. | 358/3.26 |
| 2009/0041370 A1* | 2/2009 | Wu et al. | 382/260 |
| 2012/0042232 A1* | 2/2012 | Brelsford et al. | 715/206 |

OTHER PUBLICATIONS

Yi et al., "Eliminating Noisy Information in Web Pages for Data Mining," SIGKDD '03, Washington, D.C., USA, Aug. 24-27, 2003, 10 pages.

* cited by examiner

*Primary Examiner* — Stephen Hong
*Assistant Examiner* — Marshon Robinson
(74) *Attorney, Agent, or Firm* — Lowenstein Sandler LLP

(57) ABSTRACT

A method and system for eliminating global and local noise in periodical items is described. An exemplary method may include preprocessing each item in a set of items using one or more rules, removing global noise from the set of items using semantic similarities across items in the set of items, and removing local noise in each item in the set of items based on text content in each item.

23 Claims, 13 Drawing Sheets

```
<!--startclickprintinclude-->
<TABLE> <TBODY> <TR>   <TD width=3D2> <IMG
 src=3D"http://a1012.g.akamai.net/f/1012/5356/2m/www.apa.org/i
mages/transparent.gif"=20 width=3D1> </TD>   <TD><FONT
face=3D"verdana, sans serif, helvetica, arial" >Monitor on=20
Psychology<BR>Volume      39,    No. 5         May
=2008</FONT></TD></TR></TBODY></TABLE>
<!--startclickprintexclude•
<SCRIPT            language=3Djavascript1.2=20
src=3D"http://a449.g.akamai.net/7/449/1776/000/button.clickability
.com/28=5236/button_1/button.js">=0A=</SCRIPT>
<!--endclickprintexclude•
<!--endclickprintinclude--><BR>
```

602 → <!--startclickprintinclude-->
604 → <!--startclickprintexclude•
606 → <!--endclickprintexclude•
608 → <!--endclickprintinclude-->

FIG. 6

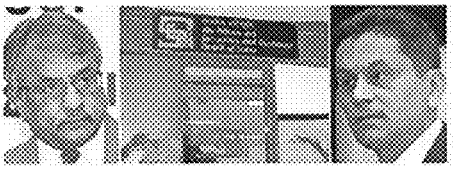
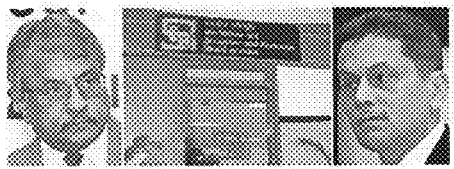
FIG. 10

ELIMINATING NOISE IN PERIODICALS

BACKGROUND

A large and growing population of users employs various electronic devices to read periodicals such as newspapers, journals, magazines, news feeds and blog feeds. Among these electronic devices are electronic book readers (e-book readers), cellular telephones, personal digital assistants (PDAs), portable media players, tablet computers, netbooks, and the like.

Converting periodicals into a format understandable by e-book readers or other electronic devices involves a significant manual effort. Publishers provide periodical feeds in diverse formats, thus requiring customized code to be written for individual publishers (or sometimes even individual titles) to map the publisher's periodical feeds to the format understandable by e-book readers or other devices. In addition, publishers' materials typically have recurring problems such as missing articles and sections and incorrect formatting, resulting in frequent non-scalable operational loads. Further, quality control usually must be done manually for every issue to ensure that it matches a source of a periodical. As e-book readers and other electronic devices continue to proliferate, finding inexpensive and effective ways to convert periodicals into a standard format understandable by the electronic devices continues to be a priority.

BRIEF DESCRIPTION OF THE DRAWINGS

FIG. 6 illustrates a portion of an exemplary periodical item including indicators of a print-friendly version, in accordance with some embodiments of the invention.

FIG. 10 illustrates removal of global noise from an exemplary periodical item in accordance with some embodiments of the invention.

DETAILED DESCRIPTION

Figure 1:
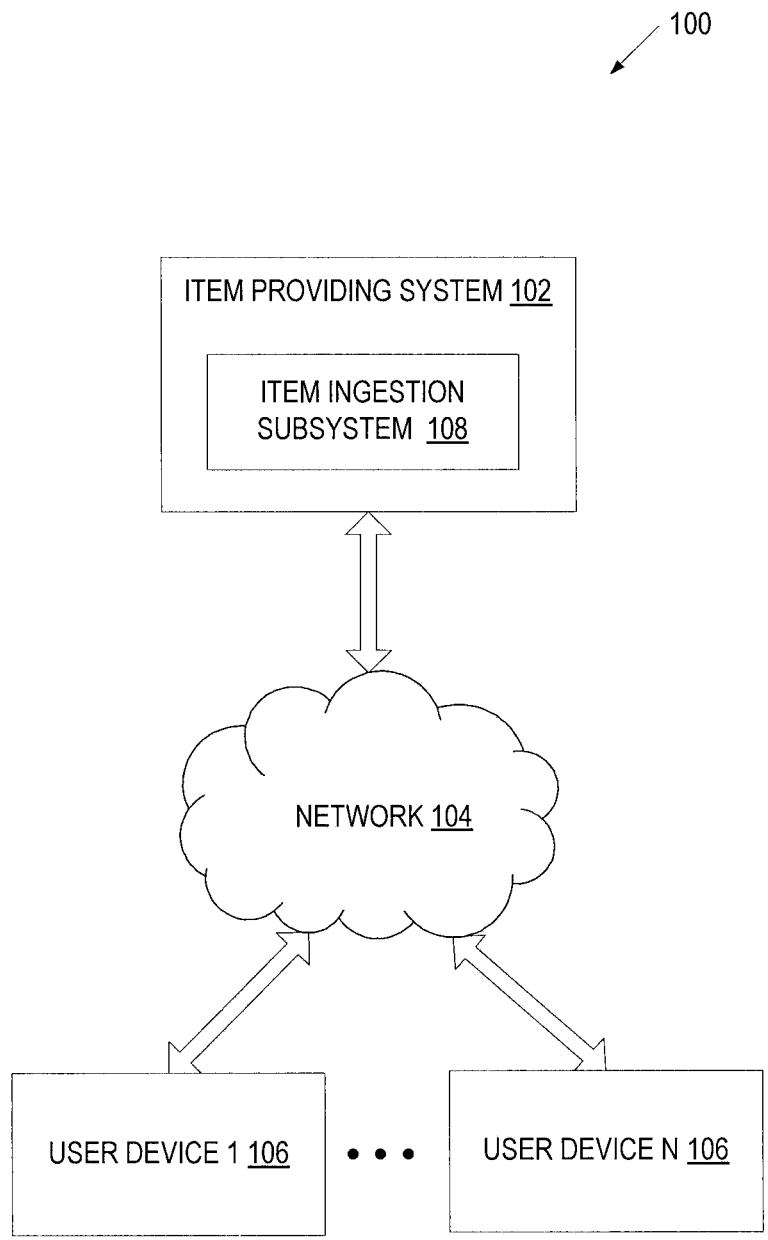
FIG. 1 is a block diagram of an exemplary network architecture in which embodiments of the invention may operate.

Methods and systems for eliminating noise in content items provided to user devices are described. A user device may be any computing device that can connect to a network. Examples of such user devices include electronic book readers, cellular telephones, personal digital assistants (PDAs), portable media players, tablet computers, netbooks, and the like. A user device may connect to a network to obtain content items from an item providing system or to perform other activities. Content items (or simply "items") may include periodical items such as newspaper articles, journal articles, magazine articles, news feeds and blog feeds, or any other semi-structured documents such as web pages that contain noise in addition to the main content.

In one embodiment, an item providing system preprocesses each item in a set of items using one or more rules. The rules may specify that an item version available via a print option should be used if the item includes a print option and the item version available via the print option satisfies a predefined threshold (e.g., a rate between the item version available via the print option and original item exceeds the predefined threshold), or that indicators of a print-friendly version should be used to filter the periodical item if the periodical item includes such indicators. In addition, in some embodiments, the rules may specify predefined irrelevant tags that should be removed from the periodical item.

The item providing system may next remove global noise from the set of periodical items using semantic similarities across periodical items in the set. In some embodiments, the global noise may be removed by building a section style tree (SST) for the set of periodical items using a document object model (DOM) tree of each periodical item in the set, calculating a composite importance value for each element node in the SST, and determining which of the element nodes in the SST constitute noise based on the composite importance values of the element nodes in the SST. In one embodiment, the process of creating and merging SSTs uses an abstraction in which the structural order is superseded by the actual textual content. This may be especially applicable to documents (e.g., news articles) for which the text itself is more important than its location on a web site (e.g., a news web site).

The item providing system may further remove local noise from each item in the set based on text content in each item. In some embodiments, local noise may be removed by calculating a content score for each node based on content percentage, calculating a link density for each node based on the number of corresponding links, calculating a local noise score for each node based on a corresponding content score and link density, and removing a node if its local noise score is below a threshold.

Accordingly, an efficient mechanism is provided that automatically removes noise from content items of various publishers, eliminating the need for developing custom code for different publishers and/or titles and for conducting manual quality control and editing. As a result, the number of content items available for user devices is increased, and manual operational costs are significantly reduced.

FIG. 1 is a block diagram of exemplary network architecture 100 in which embodiments of the invention may operate. The network architecture 100 may include an item providing system 102 and multiple user devices 106 coupled to the item providing system 102 via a network 104 (e.g., a public network such as the Internet, a private network such as a local area network (LAN), or a virtual private network (VPN)).

The user devices 106 are variously configured with different functionality to enable consumption of items. As discussed above, the items may include periodical items such as newspaper articles, journal articles, magazine articles, news feeds, and blog feeds, and other semi-structured documents such as web pages that contain noise in addition to the main content. The user devices 106 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

The item providing system 102 provides items, upgrades, and/or other information to the user devices 106 registered with the item providing system 102 via the network 104. The item providing system 102 also receives various requests, instructions and other data from the user devices 106 via the network 104. The item providing system 102 may include one or more machines (e.g., one or more server computer systems, routers, gateways) that have processing and storage capabilities to provide the above functionality.

Communication between the item providing system 102 and a user device 106 may be enabled via any communication infrastructure. One example of such an infrastructure includes a combination of a wide area network (WAN) or a VPN and wireless infrastructure, which allows a user to use the user device 106 to purchase items and consume items without being tethered to the item providing system 102 via hardwired links. The wireless infrastructure may be provided by a wireless carrier system that can be implemented using various data processing equipment, communication towers, etc. Alternatively, or in addition, the wireless carrier system may rely on satellite technology to exchange information with the user device 106. Yet alternatively, or in combination, the wireless infrastructure may be provided by an access point (e.g., WiFi access point) provider system.

The communication infrastructure may also include a communication-enabling system that serves as an intermediary in passing information between the item providing system 102 and the wireless carrier. The communication-enabling system may communicate with the wireless carrier via a dedicated channel, and may communicate with the item providing system 102 via a non-dedicated communication mechanism, e.g., a public network such as the Internet.

Users of the user devices 106 can register with the item providing system 102 to receive various items that may include, for example, periodical items and other documents. In one embodiment, the item providing system 102 includes an item ingestion subsystem 108 that converts items available on various websites into a device-readable format. An item may be an RSS (Really Simple Syndication) feed integrated into a website using HTML (Hypertext Markup Language) code and known as an RSS/HTML feed, an RSS feed integrated into a website using NITF (New Industry Text Format) and known as an RSS/NITF feed, or any other feed integrated into a website. The above feeds cannot be converted into a device-readable format using structured XML code (XML adapters) alone due to the presence of noise in the items. The item ingestion subsystem 108 facilitates conversion of items by removing noise and keeping only a subset of substantive data. Noise may include, for example, advertisements, navigation panels, and the like. The subset of substantive data may include, for example, the title, byline (the name and the position of the author), article text content and related images.

In one embodiment, the item ingestion subsystem 108 processes a set of items. A set of items may be articles within a section of a newspaper, journal or magazine issue (e.g., articles within a given section like Politics, Business, Sports), a group of news or web feeds combined by topic, or any other combination of documents that are likely to have a similar layout or style. As will be discussed in more detail below, the item ingestion subsystem 108 identifies and removes global noise in items using semantic similarities across the items in the set, and then identifies and removes local noise in individual items based on text content and links present in the item.

Once global and local noise is eliminated, the items can be easily converted into a device-readable format using structured XML adapters.

Figure 2:
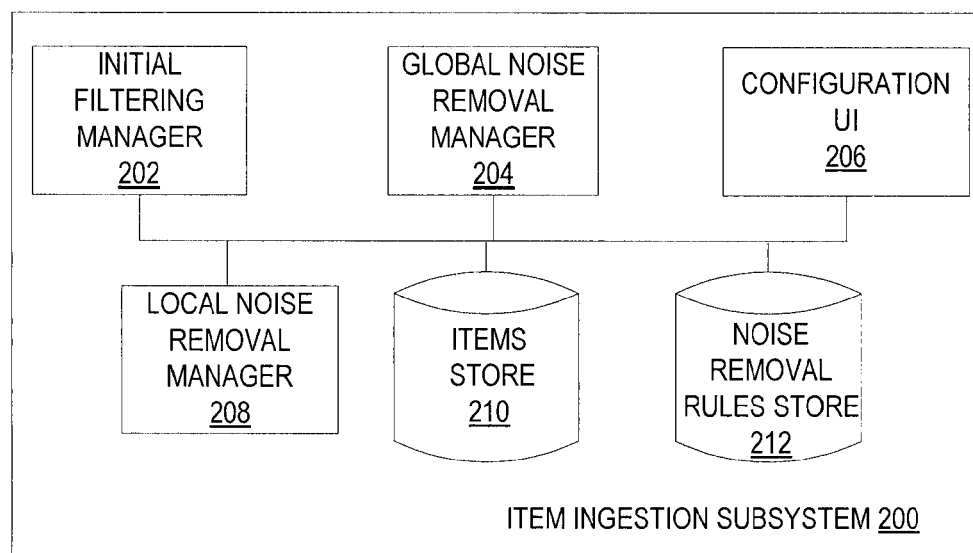
FIG. 2 is a block diagram of one embodiment of an item ingestion subsystem.

FIG. 2 is a block diagram of one embodiment of an item ingestion subsystem 200. The item ingestion subsystem 200 may be the same as the item ingestion subsystem 108 of FIG. 1. In one embodiment, the item ingestion subsystem 200 includes an initial filtering manager 202, a global noise removal manager 204, a configuration user interface (UI) 206, a local noise removal manager 208, an items store 210 and a noise removal rules store 212. The components of the item ingestion subsystem 200 may represent modules that can be combined together or separated into further modules, according to some embodiments.

The initial filtering manager 208 preprocesses each item in a set of items using one or more rules. The rules may specify that an item version available via a print option should be used if the item includes a print option, or that indicators of a print-friendly version should be used to filter the item if the item includes such indicators. In one embodiment, the item version available via the print option is used if it satisfies a predefined threshold (e.g., a rate between the item version available via the print option and original item exceeds the predefined threshold) to ensure that unwanted pages (e.g., Print edition) are not downloaded. The print option may be a print link included in the periodical item, which when activated, creates a file containing less noise than the original periodical item downloaded from the website. For example, in order to save ink, the file created via the print option ("print-friendly" file) may exclude navigation, banners, dark images and background. The print-friendly file may still include a copyright notification and/or banners at the top and/or bottom of the periodical item.

Alternatively, or in addition, the item may include indicators of a print-friendly version (e.g., comments to differentiate between the print friendly and non-print friendly content). Based on the rules, the initial filtering manager 208 may replace the original item with a print-friendly version of the item, or filter the original item using indicators of print friendly and non-print friendly content.

In some embodiments, the rules may also require that the item be cleaned to ensure that all HTML tags are closed correctly. In addition, the rules may specify predefined irrelevant tags (e.g., <script>, <noscript>, <style>, <iframe>, <form>, <object>) that should be removed from the item. Depending on the rules, the initial filtering manager 208 may first ensure that all HTML tags in the item are closed correctly and then remove the predefined tags from the item.

The rules may be stored in the noise removal rules store 212 and may be configured by a user via a user interface or a configuration file. The noise removal rule store 212 may represent a single data structure or multiple data structures (databases, repositories, files, etc.) residing on one or more mass storage devices, such as magnetic or optical storage based disks, solid-state drives (SSDs) or hard drives.

The global noise removal manager 204 removes global noise from the set of items using semantic similarities across items in the set. Global noise may include, for example, advertisements, navigation panels, copyright and privacy notices. The global noise removal manager 204 identifies global noise based on the assumption that advertisements, navigation panels, copyright and privacy notices in items from the same section share some common contents and presentation styles while the main content blocks of the items are diverse in their actual contents and/or presentation styles.

In one embodiment, the global noise removal manager 204 first builds a section style tree (SST) for the set of items using a DOM tree of each item in the set. A DOM tree represents the structure of an HTML document, with internal nodes in the DOM tree corresponding to HTML tags and leaf nodes in the DOM tree corresponding to detailed texts, images or hyperlinks. The SST is a condensed version of DOM trees of all items in the set, in which similar nodes from different DOM trees are merged and unique nodes from DOM trees are added. The SST may include two types of nodes, style nodes and element nodes. A style node represents a layout or presentation style, defined by a sequence of element nodes, and the number of items that have this particular style at this node level. An element node represents a tag node from a DOM tree, defined by the tag name (e.g., TABLE and IMG) and a set of style nodes below this element node. One embodiment of a method for creating a SST will be discussed in more detail below in conjunction with FIGS. 7 through 9.

Once the SST is built for the set of items, the global noise removal manager 204 may calculate a composite importance value for each element node in the SST. As will be discussed in more detail below in conjunction with FIG. 7, a composite importance value of an element node is calculated based on the semantics of the node and its descendants. The global noise removal manager 204 may then compare the composite importance value of each element node with the threshold, and designate the element node as noise if its composite importance value is below a threshold. Further, the global noise removal manager 204 may remove noise from each item in the set based on the element nodes designated as noise and configuration parameters. Configuration parameters may specify predefined types of element nodes that should be removed, even if they were not designated as noise during the global noise processing. In addition, the configuration parameters may specify predefined types of element nodes that should not be removed, even if they were designated as noise during the global noise processing. Configuration parameters may be provided by a user via the configuration UI 206 and may be stored in the noise removal rules store 212. In one embodiment, the configuration parameters can be modified by the user at any time using the configuration interface 206.

The local noise removal manager 208 removes local noise from each item in the set based on text content in each item. Local noise may include, for example, advertisements, links, banners, comment sections and promotions that are specific to an item. In some embodiments, the local noise removal manager 208 removes local noise by calculating a content score for each node based on text content percentage, calculating a link density for each node based on the number of corresponding links, calculating a local noise score for each node based on a corresponding text content score and link density, and removing a node if its local noise score is below a configurable threshold. One embodiment of a method for removing local noise from an item will be discussed in more detail below in conjunction with FIG. 11.

The resulting items may be stored in the items store 210 for further conversion into a device-readable format. The items store 210 may represent a single data structure or multiple data structures (databases, repositories, files, etc.) residing on one or more mass storage devices, such as magnetic or optical storage based disks, solid-state drives (SSDs) or hard drives.

Figure 3:
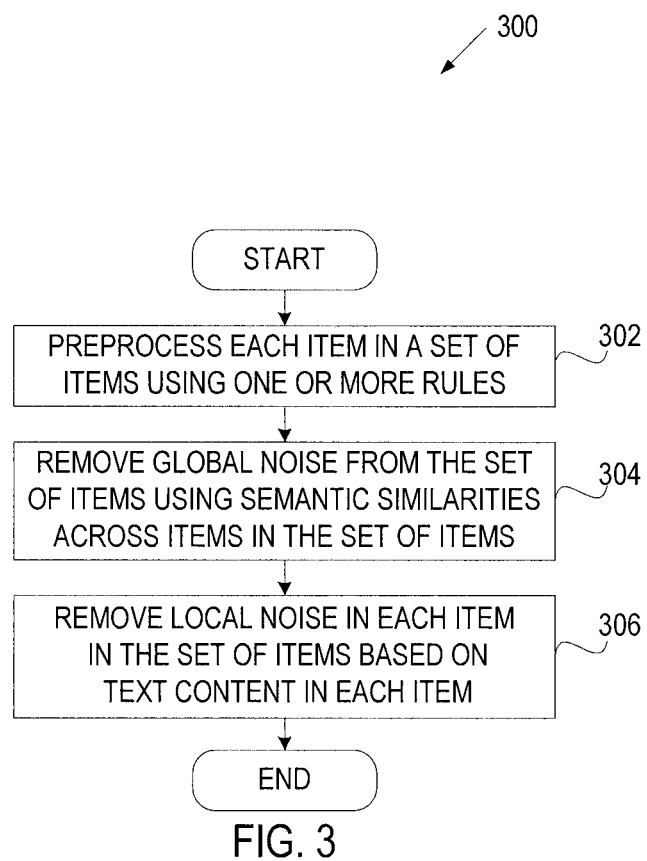
FIG. 3 is a flow diagram of one embodiment of a method for eliminating noise in content items.

FIG. 3 is a flow diagram of one embodiment of a method 300 for eliminating noise in items. The method is performed by processing logic that may comprise hardware (circuitry, dedicated logic, etc.), software (such as is run on a general purpose computer system or a dedicated machine), or a combination of both. In one embodiment, the method is performed by a server (e.g., item providing system 108 of FIG. 1).

Referring to FIG. 3, method 300 begins with the item providing system preprocessing each item in a set of items using one or more rules (block 302). Items may include periodicals such as newspaper articles, journal articles, magazine articles, news feeds and blog feeds, and other semi-structured documents such as web pages containing noise in addition to the main content. A set of items may refer to articles within a section of a newspaper, journal or magazine issue, a group of news or web feeds combined by topic, or any other combination of documents that are likely to have a similar layout or style. The rules may specify that an item version available via a print option should be used if the item includes a print option and/or the item version available via the print option satisfies a predefined threshold, and/or that indicators of a print-friendly version should be used to filter the item if the item includes such indicators. In addition, in some embodiments, the rules may require that a test be run to ensure that all HTML tags in the item are closed properly. Further, in some embodiments, the rules may specify predefined irrelevant tags that should be removed from the item. One embodiment of a method for preprocessing an item using one or more rules will be discussed in more detail below in conjunction with FIG. 4.

At block 304, the item providing system removes global noise from the set of items using semantic similarities across periodical items in the set. Global noise may include, for example, advertisements and navigation panels that have some common contents and presentation styles across items from the same set of items. In some embodiments, the item providing system removes global noise by building a SST for the set of items based on DOM trees of items in the set, calculating a composite importance value for each element node in the SST, and determining which of the element nodes in the SST constitute noise based on the composite importance values of the element nodes in the SST. One embodiment of a method for removing global noise from a set of items will be discussed in more detail below in conjunction with FIG. 7.

At block 306, the item providing system 306 removes local noise from items in the set based on text content in each item. Local noise may include, for example, advertisements, links, banners, comment sections and promotions that are specific to an item. In some embodiments, local noise may be removed by calculating a text content score for each node based on text content percentage, calculating a link density for each node based on the number of corresponding links, calculating a local noise score for each node based on a corresponding text content score and link density, and removing a node if its local noise score is below a threshold. One embodiment of a method for removing local noise from an item will be discussed in more detail below in conjunction with FIG. 11.

Figure 4:
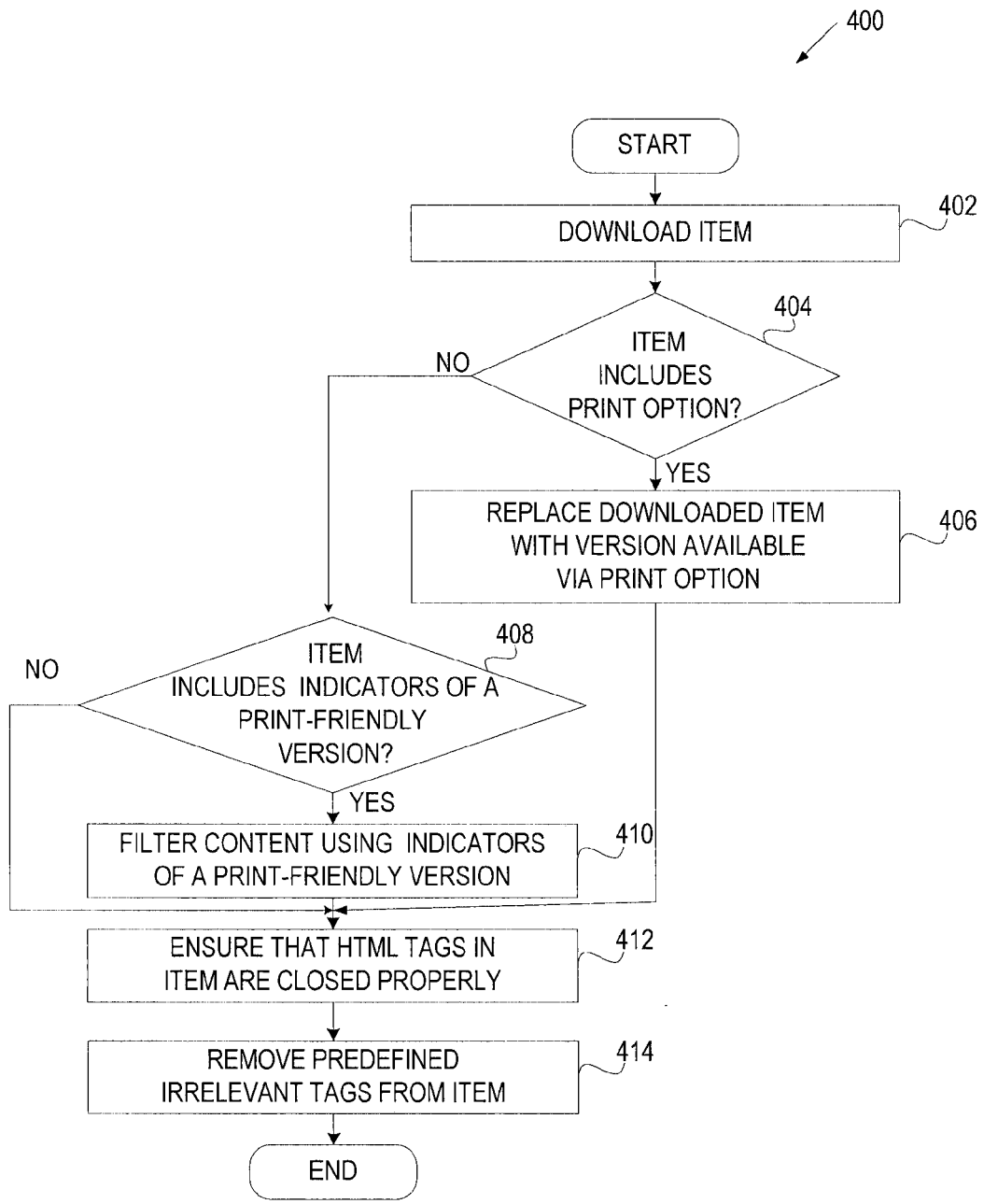
FIG. 4 is a flow diagram of one embodiment of a method for pre-processing 1 content items using a set of rules.

FIG. 4 is a flow diagram of one embodiment of a method 400 for pre-processing an item using a set of rules. The method is performed by processing logic that may comprise hardware (circuitry, dedicated logic, etc.), software (such as is run on a general purpose computer system or a dedicated machine), or a combination of both. In one embodiment, the method is performed by a server (e.g., item providing system 108 of FIG. 1).

Figure 5:
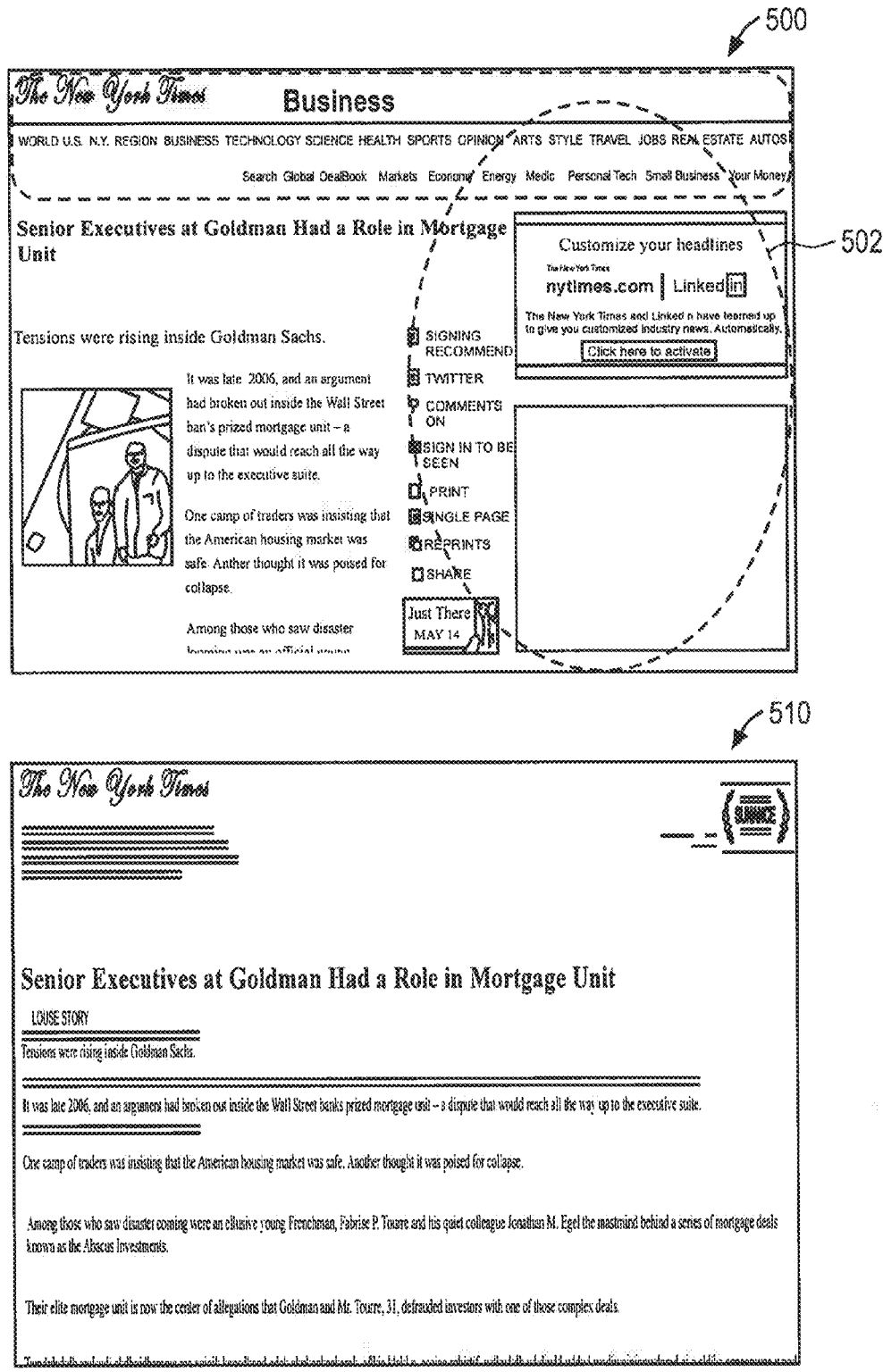
FIG. 5 illustrates the use of a print option in accordance with some embodiments of the invention.

Referring to FIG. 4, method 400 begins with the item providing system downloading an item from a website (e.g., a publisher's website such as a news website or a magazine website) (block 402). Many website provide a print option for items to create a print-friendly version in which navigation, banners, dark images and backgrounds are removed to save ink. At block 404, the item providing system determines whether the item includes a print option (e.g., a print link). If so and the print-friendly version available via the print option satisfies a predefined threshold (e.g., the rate between the print-friendly version and original item exceeds the predefined threshold), the item providing system replaces the downloaded item with the print-friendly version available via the print option (block 406) and proceeds to block 412. FIG. 5 illustrates the use of a print option in accordance with some embodiments of the invention. The original article web page 502 includes advertisements and other noise within dotted lines 502. The web page 510 is a print-friendly version of the web page 510. As shown, noise 502 is no longer included in the web page 510.

Referring again to FIG. 4, if the item providing system determines at block 404 that the item does not includes a print link, the item providing system further determines whether the item includes indicators of a print-friendly version (block 408). These indicators might have been added to the item (e.g., by a tool known as Clickability) in advance to allow a user to print the item in a printer-friendly format upon selecting a print option ("Print this" hyperlink). This functionality is enabled by including in the HTML source of the item comments to differentiate between the print friendly and non-print friendly content. It can be regarded as hints given by the publisher to determine news artifacts. FIG. 6 illustrates a portion 600 of an exemplary periodical item including indicators of a print-friendly version, in accordance with some embodiments of the invention. As shown, portion 600 includes tags "<!-startprintinclude→" 602 and "<!-endprintinclude→" 608, and tags "<!-startprintexclude→" 604 and "<!-endprintexclude→" 606. On clicking "Print this page" link, all content text contained within standard tags "<!-startprintinclude→"602 and "<!-endprintinclude→" 608 is included in the print-friendly version. The text contained within standard comment tags "<!-startprintexclude→" 604 and "<!-endprintexclude→" 606 is excluded from the print-friendly version.

Returning to FIG. 4, if the item includes indicators of a print-friendly version and/or a non-print friendly version, the item providing system creates the print-friendly version of the item based on these indicators (block 410) and proceeds to block 412. If the item does not include indicators of a print-friendly version and/or a non-print friendly version, the item providing system skips block 410 and proceeds to block 412 directly.

At block 412, the item providing system ensures that HTML tags in the item are closed properly using an HTML syntax checker (e.g., JTidy or HTML Tidy). At block 414, the item providing system removes predefined irrelevant tags from the item. The predefined tags may include tags like <script>, <noscript>, <style>, <iframe>, <form>, <object>, which neither provide any extra information for item conversion, nor are useful within a converted item.

Figure 7:
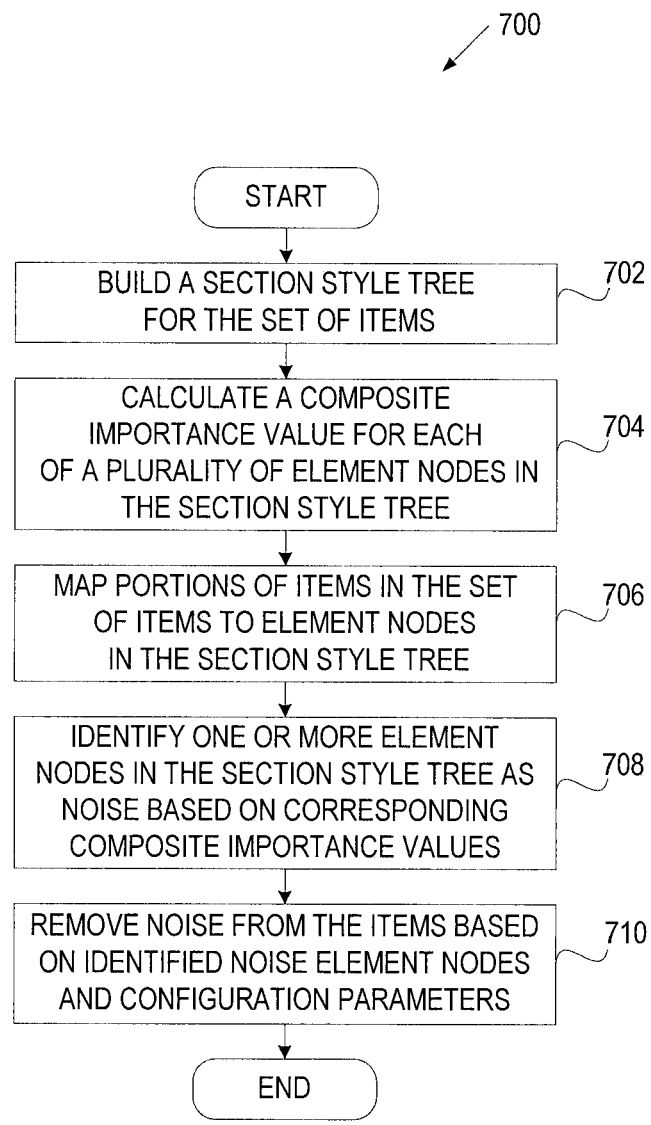
FIG. 7 is a flow diagram of one embodiment of a method for removing global noise from content items.

FIG. 7 is a flow diagram of one embodiment of a method 700 for removing global noise from items. The method is performed by processing logic that may comprise hardware (circuitry, dedicated logic, etc.), software (such as is run on a general purpose computer system or a dedicated machine), or a combination of both. In one embodiment, the method is performed by a server (e.g., item providing system 108 of FIG. 1).

Referring to FIG. 7, method 700 begins with the item providing system building a section style tree (SST) for a set of items. Based on empirical data, it was determined that all items (e.g., news articles) within a given section of a website (e.g., news website) use the same web page pattern. The SST captures the common presentation styles and actual content of the items of a given section within a website and represents a condensed version of DOM trees of all items within the given section. In one embodiment, the SST includes two types of nodes, style nodes and element nodes. A style node (S) represents a layout or presentation style, which has two components, denoted by (Es, n), where Es is a sequence of element nodes, and n is the number of items (referred to as a page count) that has this particular style at this node level. An element node E has two components, denoted by (TAG, Ss), where TAG is the tag name (e.g., TABLE and IMG), and Ss is a set of style nodes below E.

In a periodical web feed, there are significant structural differences among articles, although the contents of the articles may be the same. For example, some of the articles may include extra <p> tag, extra <img> tag, and the like. Taking into account just the structural similarities would treat all these components as different nodes, resulting in hardly any noise removal. To overcome this, embodiments of the invention use a closeness measure, which is based on semantic similarities, to merge the nodes to the SST, as opposed to the use of exact structural similarities. In a periodical feed, more importance is given to text nodes, hence the importance of a node is calculated by giving more weight to textual contents, rather than structural characteristics. For better noise detection, nodes with same content are merged even if their structure does not match exactly.

In one embodiment, a closeness measure is computed to represent how close a node is to another node at the same level in the SST by. The closeness measure may be computed by identifying an element type and text content of a node, comparing the type and text of every child node recursively, and covering several levels of the SST (e.g., 3 levels of the SST) to compute the closest node to merge.

Figure 8:
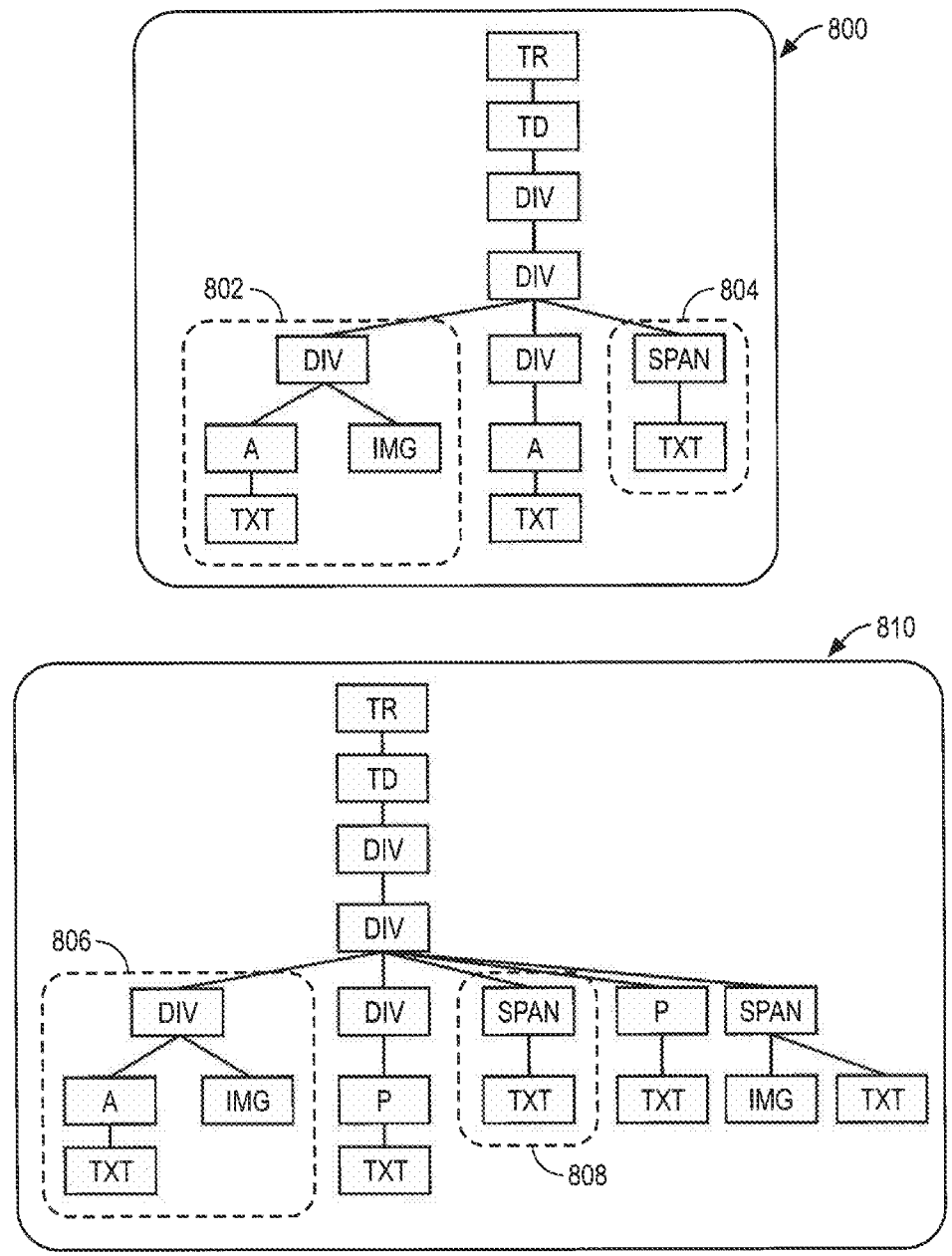
FIG. 8 illustrates DOM trees associated with two exemplary periodical items.
Figure 9:
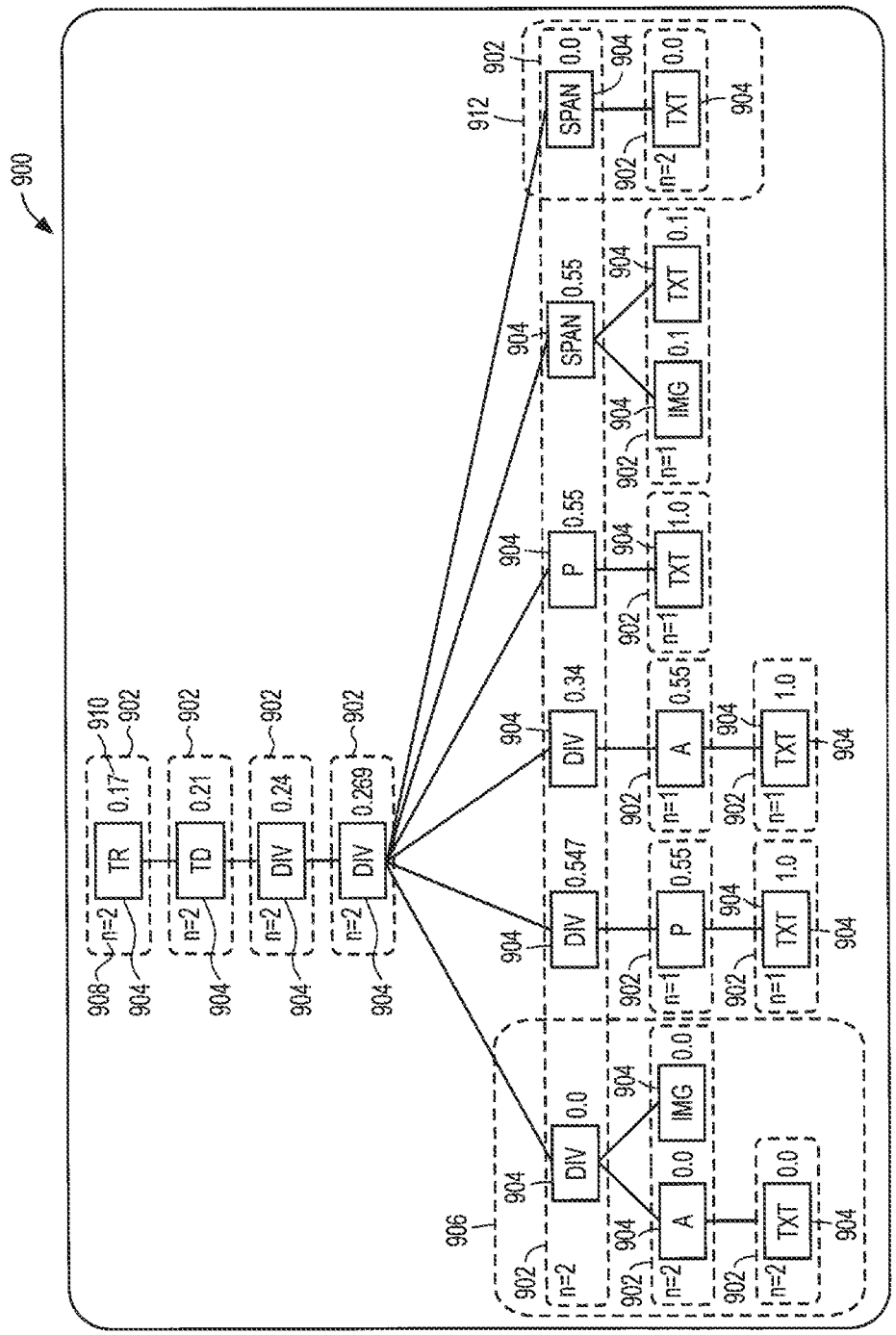
FIG. 9 illustrates an exemplary section style tree built from DOM trees of FIG. 8 in accordance with some embodiments of the invention.

FIGS. 8 and 9 illustrate the creation of a SST for a set of two exemplary periodical items. FIG. 8 illustrates DOM trees 800 and 810 associated with two exemplary periodical items. Two pairs of sections, 802/806 and 804/808, are semantically similar in both DOM trees 800 and 810.

FIG. 9 illustrates an exemplary SST 900 built from DOM trees 800 and 810 of FIG. 8 in accordance with some embodiments of the invention. SST 900 includes style nodes 902 and element nodes 904. Each style node is defined by a sequence of element nodes and the number of periodical items (page count) that has this particular style at this node level. For example, the largest style node 902 has 6 element nodes, DIV, DIV, DIV, P, SPAN and SPAN, and the page count of this style node 902 is equal to 2. Each element node 904 is defined by the tag name and the set of style nodes below this element node.

In one embodiment, the SST 900 is created by merging DOM trees 800 and 810 in a top-down fashion. Specifically, for a current element node 904 in SST 900, which has the corresponding tag node T in the DOM tree, an html element in the DOM tree is compared with all elements at the same level in the SST 900, and a closeness measure is computed to represent how close an element is to another element at the same level in the SST, as discussed in more detail above.

If the current element node is a text node such as <P>, <DIV>, <SPAN>, the textual equivalence of the tag nodes is compared. In one embodiment, the tag nodes are compared by comparing text content of the current node with all descendants of the current node within several levels (e.g., 3 levels). For <IMG> tags, the 'src' attributes of the tag nodes are compared. If the textual contents or src attributes of the tag nodes match, the page count of the style node 902 is incremented, and merging of the nodes in the DOM trees 800 and 810 is continued.

If the sequence of child tag nodes of T in the DOM tree is not the same as the sequence of element nodes 904 in the style node 902 below the current element node 904 in SST 900, and the textual content of the tag nodes does not match, a new style node 902 is created below the element node 904 in SST 900. The sub-tree of the tag node T in the DOM tree is copied to SST 900 after being converted to style nodes and element nodes of SST 900.

Returning to FIG. 7, at block 704, the item providing system calculates a composite importance value for each element node in the SST. In one embodiment, in which items may have many structural differences while having the same content (e.g., extra <p> tag, extra <img> tag), the item providing system calculates a composite importance value based on semantic similarities, as opposed to exact structure similarity. For example, in a periodical feed, more importance is given to text nodes. Hence, textual contents have more weight in calculating the node importance than the structural characteristics. For better noise detection, nodes with same content can be merged even if their structure does not exactly match. For example, as shown in FIG. 9, nodes in sections 802 and 806, and 804 and 808 of DOM trees 800 and 810 are merged into nodes of sections 906 and 912 of SST 900 respectively, even though there is no structural similarity in these nodes. In addition, nodes which have the same structure but different text values are not merged. For example, <DIV><IMG src="a.jpg"/></DIV> and <DIV><IMG src="b.jpg"/></DIV> will result in two style nodes <DIV><IMG src="a.jpg"/></DIV> and <DIV><IMG src="b.jpg"/> in the resulting SST.

Exemplary expressions for calculating a composite importance value of an element node will now be discussed in more detail. In particular, let m be the number of pages containing a leaf element node E and l be the number of child style nodes of E (i.e., l=|E.Ss|), then the node importance of E, denoted by NodeImp(E), can be defined as follows:

$$NodeImp(E) = \begin{cases} -\sum_{i=1}^{l} p_i \log_{10} p_i, & m > 1 \\ 1, & m = 1 \end{cases} \quad (1)$$

In expression (1), $p_i$ is the probability of an item using the ith style node in E.Ss.

Based on expression (1), the importance of the <TR> tag in the SST 900 will be zero. However, before making a determination as to whether TR is a noisy item, the importance of its descendents should be considered and a composite importance value should be calculated based on the importance of an element node and its descendents.

For an internal element node, E in the SST, let l=|E.Ss|. Then the composite importance of E, denoted by CompImp(E), can be defined as follows:

$$CompImp(E) = (1 - \gamma^l) NodeImp(E) + \gamma^l \sum_{i=0}^{l} (p_i CompImp(S_i)) \quad (2)$$

In expression (2), $p_i$ is the probability of E having the $i^{th}$ child style node in E.Ss and γ is a predefined constant. In addition, CompImp(Si) is the composite importance of a style node Si (E.Ss), which can be defined as follows:

$$CompImp(S_i) = \frac{\sum_{j=1}^{k} CompImp(E_j)}{k} \quad (3)$$

where k=|Si.Es|, which is the number of element nodes in Si.

For leaf nodes, the composite importance value of the node determines whether the node is noisy or not, and can be defined as follows:

$$CompImp(E) = \qquad (4)$$
$$\begin{cases} 0 & \text{if } m > \text{threshold} \times \text{totalNumPages} \\ 1 - \frac{m}{\text{totalNumPages}} & \text{otherwise} \end{cases}$$

Based on observation, the threshold in expression (4) can be set to 0.3, which means that if 3 out of 10 items have the leaf node repeated and m is the number of pages in which the element node is present, then it is potentially a noisy node.

In FIG. 9, each style node in SST 900 has a page count (page count 908), and each element node has a composite importance value (value 910) calculated as discussed above.

Returning to FIG. 7, at block 706, the item providing system maps portions of items in the set of items to element nodes in the SST to determine noise portions of the items. At block 708, the item providing system identifies one or more element nodes in the SST as noise based on corresponding composite importance values. In particular, an element node can be identified as a noise item if its composite importance value is below a threshold.

At block 710, the item providing system removes noise from the items based on identified noise element nodes and configuration parameters. Configuration parameters can specify predefined types of element nodes to be removed and predefined types of element nodes not to be removed. Configuration parameters provide flexibility to always retain or remove certain nodes regardless of whether they are identified as global noise or not. For example, the author name for a journal can be repeated in multiple articles and therefore can be identified as noise during the global noise removal process. To avoid this, the configuration parameters may require that the node associated with the author name will always be retained. Similarly, certain nodes should always be removed even if not identified as global noise (e.g., the nodes with style set as 'display:none;').

In one embodiment, the configuration parameters are specified using an XML structure that may define a series of XPATHs that need to be retained or removed. There may be two variations of each structure, one to remove the node alone and the other to remove the node along with its children. For example, if the RETAIN_TAGS option is used, the Xpaths defined within this option will not be dropped even if they are determined to be noisy nodes. If the RETAIN_TAGS_AND_CHILDREN option is used, the Xpaths defined within this option along with its children will not be dropped, even if they are determined to be noisy nodes. If the REMOVE_TAGS option is used, the Xpaths defined within this option will be dropped, and if the REMOVE_TAGS_AND_CHILDREN option is used, the Xpaths defined within this option along with its children will be dropped. In one embodiment, dynamic XSL (extensible stylesheet language) is used to configure the global noise removal process based on the configuration parameters described above.

FIG. 10 illustrates removal of global noise from an exemplary periodical item in accordance with some embodiments of the invention. Web page 1000 includes navigation panels 1002 and 1004. Web page 1010 is a modified version of the web page 1002 that went through the global noise removal process. As shown, navigation panels 1002 and 1004 are no longer included in the web page 1010.

Figure 11:
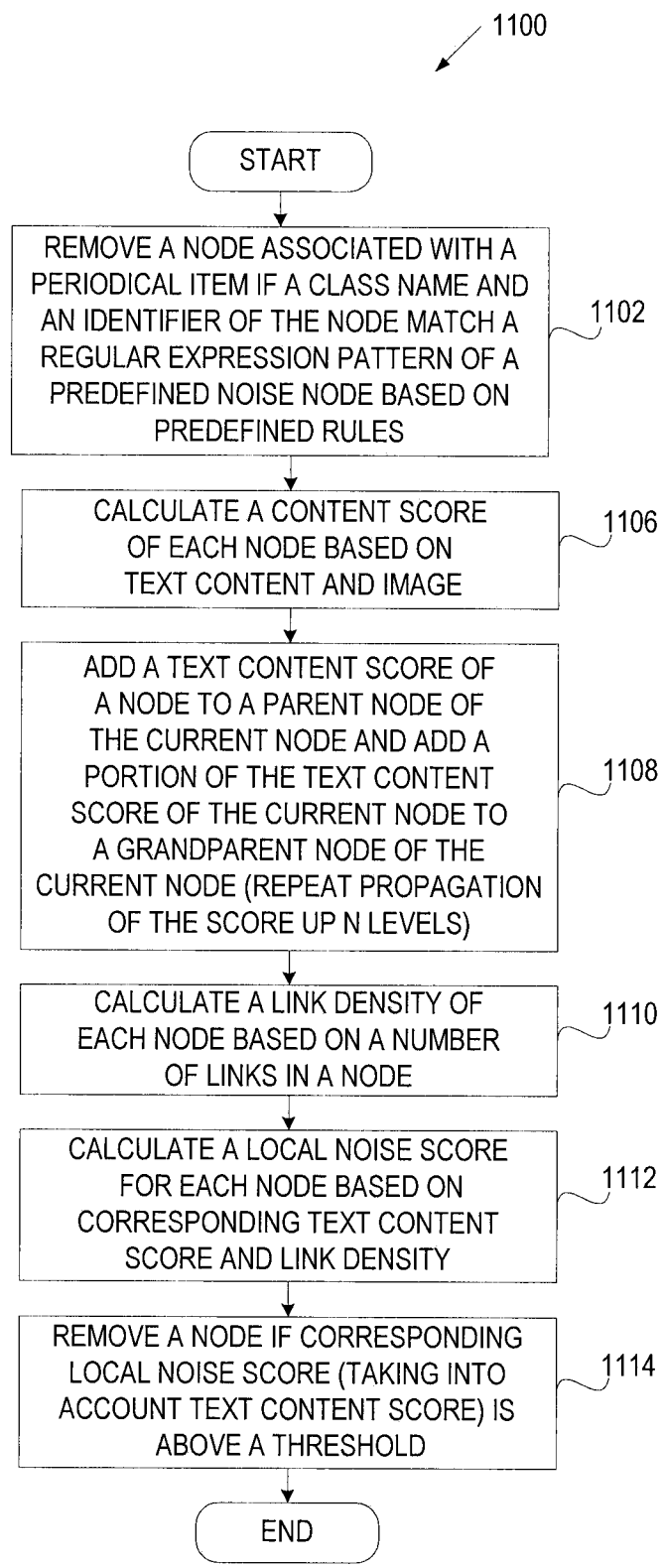
FIG. 11 is a flow diagram of one embodiment of a method for removing local noise from a content item.

FIG. 11 is a flow diagram of one embodiment of a method 1100 for removing global noise from a periodical item. The method is performed by processing logic that may comprise hardware (circuitry, dedicated logic, etc.), software (such as is run on a general purpose computer system or a dedicated machine), or a combination of both. In one embodiment, the method is performed by a server (e.g., item providing system 108 of FIG. 1).

Referring to FIG. 11, method 1100 begins with the item providing system removing a node associated with an item if a class name and an identifier of the node match a regular expression pattern of a predefined noise node based on the rules set for the items. The rules may be customized or default for a specific item type (e.g. for individual periodicals). At block 1106, the item providing system calculates a content score for each node containing text based on text and image content. The content score of a node increases proportionally to the percentage of text and image present in that node. In one embodiment, the content score is defined as follows $$ContentScore=\min(textLength,3) \quad (5)$$

At block 1108, the item providing system adds the text content score of the node to a parent node of the current node and adds a portion (50%) of the text content score of the node to a grandparent node of the current node and repeats this procedure for several levels (e.g., 3 levels) of nodes . . . . At block 1110, the item providing system calculates a link density of each node based on the number of links in a node. In one embodiment, the link density of a node is calculated based on the number of links as a percentage of content in the node, e.g., the amount of text that is inside a link divided by the total text in the node. Good news content should have a relatively small link density At block 1112, the item providing system calculates a local noise score for each node based on corresponding text content score and link density. At block 1114, the item providing system removes a node if a corresponding local noise score is above a threshold.

In one embodiment, non leaf nodes with the highest candidate score are considered the top candidate. If there is no top candidate, the <BODY> node is used as the top candidate, since it contains all tags in a given page. Then, the top candidate's siblings are searched for content that might be related to the top candidate. Based on the top candidate score and link density, it is determined whether a given sibling node can be appended to the article contents. This processing helps grouping together article images, byline and title so that all required periodical portions are obtained from the periodical item even if one of them is the top candidate.

Finally, in one embodiment, the selected nodes in the item are further cleaned for presentation. This may involve removing noisy tags such as anchor tags present as children of all the tags in the selected content. This cleaning is again based on comparing measures like text content length, class names defined by rules, and link density against pre-defined thresholds. If a given node is found to be "noisy" (e.g., its score on any measure is less than the threshold), it is dropped. For example, a series of images without any text content and series of list tags with anchors can be removed by this step.

Figure 12:
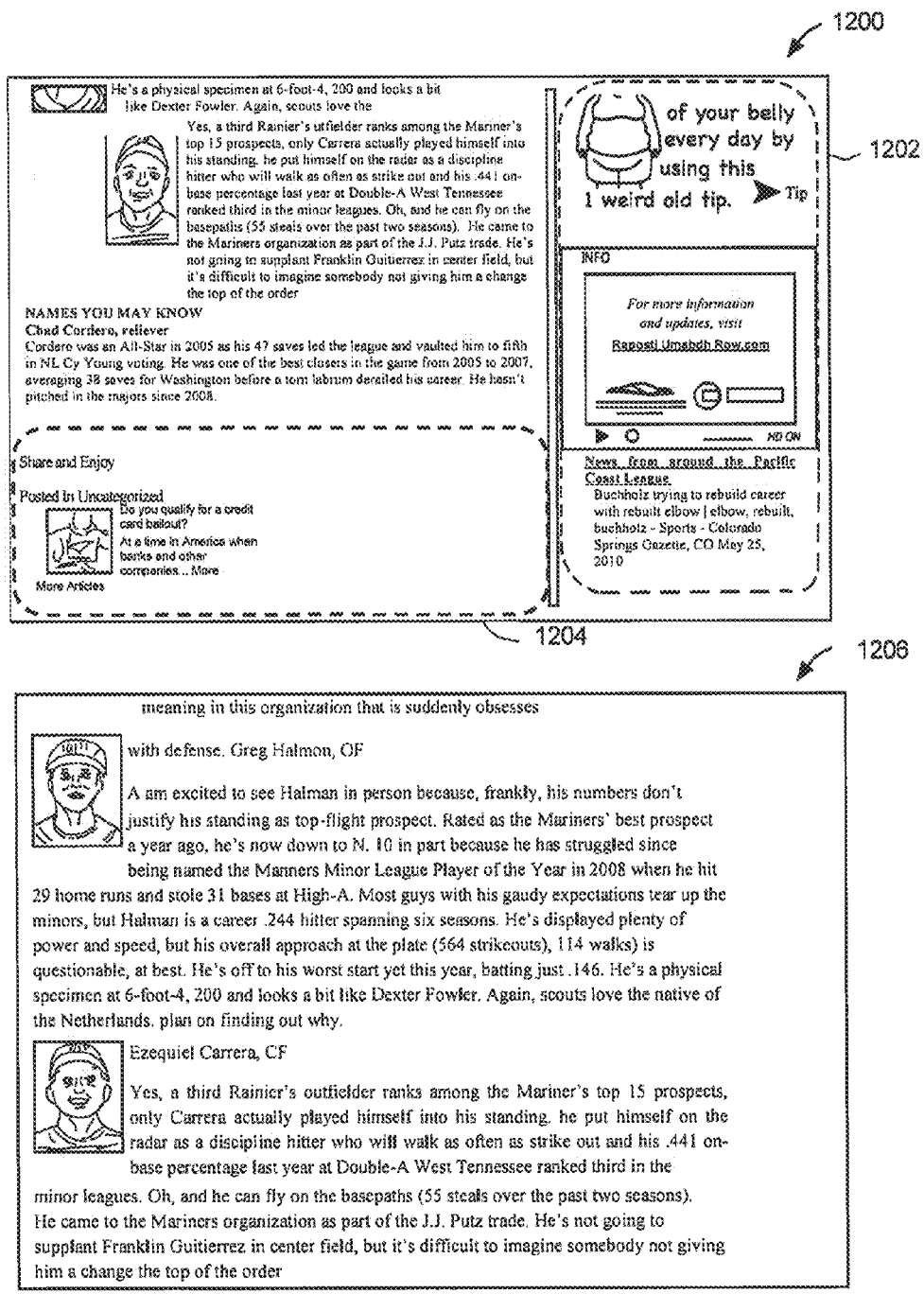
FIG. 12 illustrates removal of local noise from an exemplary periodical item in accordance with some embodiments of the invention.

FIG. 12 illustrates removal of local noise from an exemplary periodical item in accordance with some embodiments of the invention. Web page 1200 includes news content and local noise such as a banner 1202 and comments 1204. Web page 1210 is a modified version of the web page 1200 that went through the local noise removal process. As shown, banner 1202 and comments 1204 are no longer included in the web page 1210.

Figure 13:
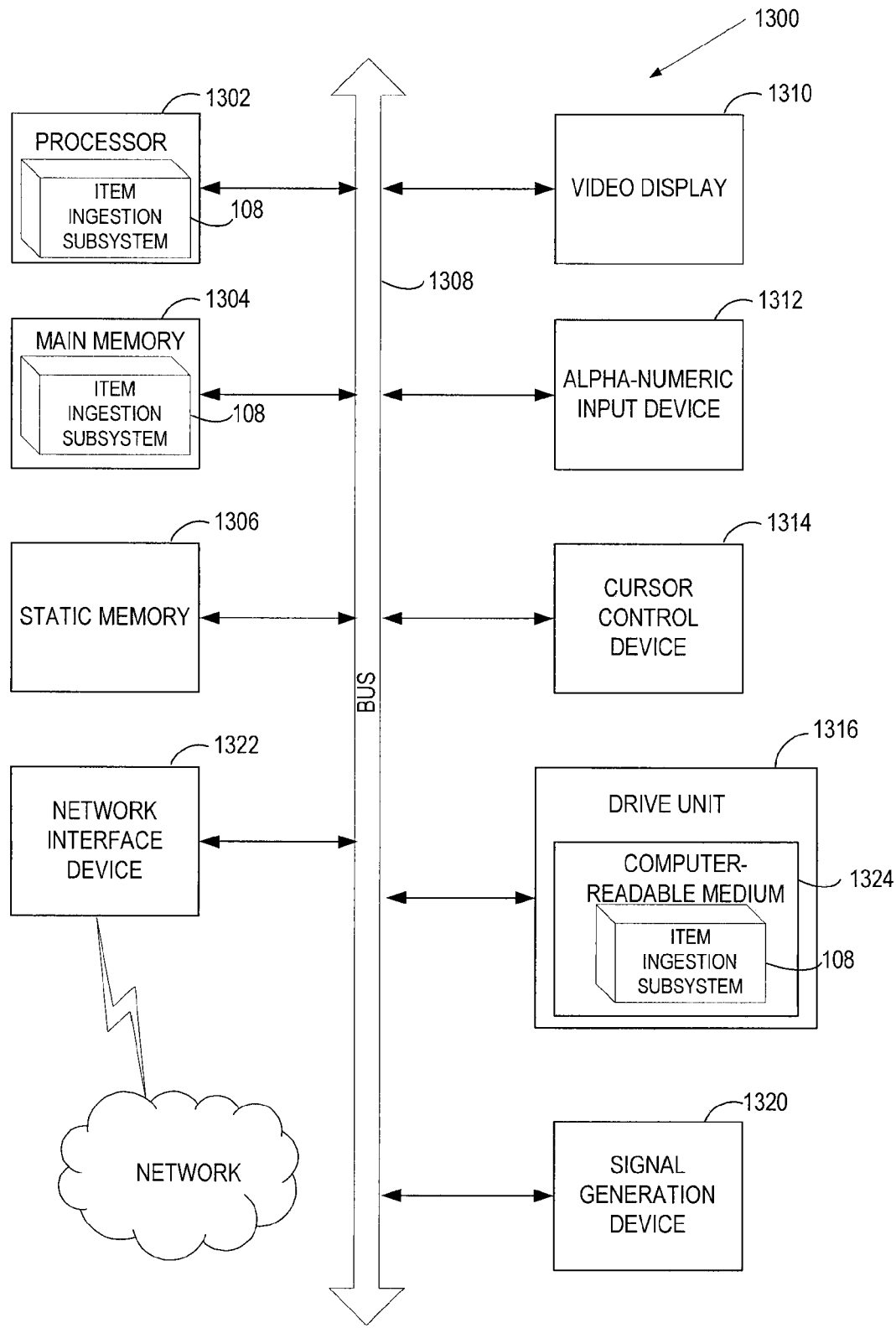
FIG. 13 illustrates an exemplary item providing system.

FIG. 13 illustrates an exemplary item providing system 1300 in the form of a computer system within which a set of instructions, for causing the machine to perform any one or more of the methodologies discussed herein, may be executed. In some embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1300 includes a processing system (processor) 1302, a main memory 1304 (e.g., read-only memory (ROM), flash memory, dynamic random access memory (DRAM) such as synchronous DRAM (SDRAM)), a static memory 1306 (e.g., flash memory, static random access memory (SRAM)), and a data storage device 1316, which communicate with each other via a bus 1306.

Processor 1302 represents one or more general-purpose processing devices such as a microprocessor, central processing unit, or the like. More particularly, the processor 1302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1302 may also be one or more special-purpose processing devices such as an application specific integrated circuit (ASIC), a field programmable gate array (FPGA), a digital signal processor (DSP), network processor, or the like. The processor 1302 is configured to execute the item ingestion subsystem 108 for performing the operations and steps discussed herein.

The computer system 1300 may further include a network interface device 1322. The computer system 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse), and a signal generation device 1320 (e.g., a speaker).

A drive unit 1316 may include a computer-readable medium 1324 on which is stored one or more sets of instructions (e.g., instructions of item ingestion subsystem 108) embodying any one or more of the methodologies or functions described herein. The instructions of the item ingestion subsystem 108 may also reside, completely or at least partially, within the main memory 1304 and/or within the processor 1302 during execution thereof by the computer system 1300, the main memory 1304 and the processor 1302 also constituting computer-readable media. The instructions of the item ingestion subsystem 108 may further be transmitted or received over a network via the network interface device 1322.

While the computer-readable storage medium 1324 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying", "creating", "notifying", "allowing" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, comprising:
preprocessing, by a server computer system, each item in a set of items using one or more rules, wherein preprocessing an item in the set of items comprises:
determining that the item includes a print option; and
using a version of the item associated with the print option instead of an alternate version;
removing, by the server computer system, global noise from the set of items using semantic similarities across items in the set of items; and
removing, by the server computer system, local noise in the item of the set of items, wherein removing the local noise in the item of the set of items comprises:
determining an amount of content for a node associated with the item;
calculating a content score for the node based on the amount of content;
calculating a link density for the node based on a number of links in the node as a percentage of the content;
calculating a local noise score for the node based on the content score and the link density; and
removing the node responsive to a determination that the local noise score is above a threshold.

2. The method of claim 1 wherein preprocessing the item further comprises:
determining whether the item includes indicators of a print-friendly version;
responsive to determining that the item includes the indicators of the print-friendly version, removing non-print friendly content from the item; and
removing predefined irrelevant tags from the item.

3. The method of claim 1 wherein removing global noise from the set of items using semantic similarities comprises:
building a section style tree for the set of items using a closeness measure to merge nodes from each item;
calculating a composite importance value for each of a plurality of element nodes in the section style tree;
mapping portions of items in the set of items to element nodes in the section style tree using the closeness measure; and
identifying one or more element nodes in the section style tree as noise based on corresponding composite importance values.

4. The method of claim 3 wherein building the section style tree for the set of items comprises:
creating a plurality of document object model (DOM) trees for the set of items;
creating an element node in the section style tree for each tag node in a first of the plurality of DOM trees;

merging a tag node of a subsequent DOM tree into the created element node responsive to a determination that children of the tag node correspond to children of the created element node and textual content of the tag node corresponds to textual content of the created element node;

responsive to a determination that children of the tag node do not correspond to children of the created element node or textual content of the tag node does not correspond to textual content of the created element node, creating a new style node underneath the created element node and adding the children of the tag node as a sub-tree of the new style node; and calculating a page count of each style node based on a number of corresponding merged tag nodes.

5. The method of claim 3 wherein calculating the composite importance value for each of the plurality of element nodes in the section style tree comprises:

calculating a leaf node importance value of each leaf element node in the section style tree; and calculating the composite importance value for each of the plurality of element nodes using leaf node importance values of corresponding leaf element nodes.

6. The method of claim 3 wherein the one or more element nodes are identified as noise when corresponding composite importance values are below a threshold.

7. The method of claim 3 further comprising:

removing noise from the set of items based on the one or more element nodes identified as noise and based on configuration parameters.

8. The method of claim 7 wherein the configuration parameters specify predefined types of element nodes to be removed and predefined types of element nodes not to be removed.

9. The method of claim 1 wherein removing the local noise in the item in the set of items further comprises:

removing a particular node associated with the item of the set of items responsive to a determination that a class name and an identifier of the particular node match a regular expression pattern of a predefined noise node;

adding the content score of a current node to a parent node of the current node and adding a portion of the content score of the current node to a grandparent node of the current node; and repeating the calculating and the adding for nodes at a number of higher levels.

10. The method of claim 1 wherein the item is any one of a newspaper article, a magazine article, a news feed and a blog feed.

11. A non-transitory computer readable storage medium including instructions that, when executed by a processor, cause the processor to perform operations comprising:

preprocessing, by the processor, each item in a set of items using one or more rules, wherein preprocessing an item in the set of items comprises:

determining that the item includes a print option; and using a version of the item associated with the print option instead of an alternate version;

removing, by the processor, global noise from the set of items using semantic similarities across items in the set of items; and removing, by the processor, local noise in the item of the set of items, wherein removing the local noise in the item of the set of items comprises:

determining an amount of content for a node associated with the item;

calculating a content score for the node based on the amount of content;

calculating a link density for the node based on a number of links in the node as a percentage of the content;

calculating a local noise score for the node based on the content score and the link density; and removing the node responsive to a determination that the local noise score is above a threshold.

12. The non-transitory computer readable storage medium of claim 11 wherein preprocessing the item further comprises:

determining whether the item includes indicators of a print-friendly version;

responsive to determining that the item includes the indicators of the print-friendly version, removing non-print friendly content from the item; and removing predefined irrelevant tags from the item.

13. The non-transitory computer readable storage medium of claim 11 wherein removing global noise from the set of items using semantic similarities comprises:

building a section style tree for the set of items using a closeness measure to merge nodes from each item;

calculating a composite importance value for each of a plurality of element nodes in the section style tree;

mapping portions of items in the set of items to element nodes in the section style tree using the closeness measure; and identifying one or more element nodes in the section style tree as noise based on corresponding composite importance values.

14. The non-transitory computer readable storage medium of claim 13 wherein building the section style tree for the set of items comprises:

creating a plurality of document object model (DOM) trees for the set of items;

creating an element node in the section style tree for each tag node in a first of the plurality of DOM trees;

merging a tag node of a subsequent DOM tree into the created element node responsive to a determination that children of the tag node correspond to children of the created element node and textual content of the tag node corresponds to textual content of the created element node;

responsive to a determination that children of the tag node do not correspond to children of the created element node or textual content of the tag node does not correspond to textual content of the created element node, creating a new style node underneath the created element node and adding the children of the tag node as a sub-tree of the new style node; and calculating a page count of each style node based on a number of corresponding merged tag nodes.

15. The non-transitory computer readable storage medium of claim 13 wherein calculating the composite importance value for each of the plurality of element nodes in the section style tree comprises:

calculating a leaf node importance value of each leaf element node in the section style tree; and calculating the composite importance value for each of the plurality of element nodes using leaf node importance values of corresponding leaf element nodes.

16. The non-transitory computer readable storage medium of claim 13 wherein the one or more element nodes are identified as noise when corresponding composite importance values are below a threshold.

17. The non-transitory computer readable storage medium of claim 13, the operations further comprising:
removing noise from the set of items based on the one or more element nodes identified as noise and based on configuration parameters.

18. The non-transitory computer readable storage medium of claim 17 wherein the configuration parameters specify predefined types of element nodes to be removed and predefined types of element nodes not to be removed.

19. The non-transitory computer readable storage medium of claim 11 wherein removing the local noise in the item in the set of items further comprises:
removing a particular node associated with the item of the set of items responsive to a determination that a class name and an identifier of the particular node match a regular expression pattern of a predefined noise node;
adding the content score of a current node to a parent node of the current node and adding a portion of the content score of the current node to a grandparent node of the current node; and
repeating the calculating and the adding for nodes at a number of higher levels.

20. A server computer system comprising:
a memory; and
a processor, coupled to the memory, the processor to:
preprocess each item in a set of items using one or more rules, wherein to preprocess an item in the set of items the processor is to:
determine that the item includes a print option; and
use a version of the item associated with the print option instead of an alternate version;
remove global noise from the set of items using semantic similarities across items in the set of items; and
remove local noise in the item of the set of items, wherein to remove the local noise in an item of the set of items the processor is to:
determine an amount of content for a node associated with the item;
calculate a content score for the node based on the amount of content;
calculate a link density for the node based on a number of links in the node as a percentage of the content;
calculate a local noise score for the node based on the content score and the link density; and
remove the node responsive to a determination that the local noise score is above a threshold.

21. The method of claim 1, further comprising:
using a syntax checker to determine whether any hypertext markup language (HTML) tags in each item are not closed properly;
correcting the HTML tags that were not closed properly; and
removing the HTML tags having predefined properties.

22. The method of claim 21, wherein the HTML tags having the predefined properties comprise script tags, noscript tags, style tags, iframe tags, form tags and object tags.

23. The method of claim 1, wherein an increase in the number of links in the node causes the local noise score for that node to increase.

* * * * *